3,542,575
TITANIUM DIOXIDE FOR USE IN COATING COMPOSITIONS
John E. Nelson, Phoenix, Ariz., assignor to National Lead Company, New York, N.Y., a corporation of New Jersey
No Drawing. Filed Dec. 15, 1967, Ser. No. 690,735
Int. Cl. B02c 1/00, 19/06
U.S. Cl. 106—300                                      4 Claims

ABSTRACT OF THE DISCLOSURE

The present invention relates to a titanium dioxide pigment having improved wettability in coating compositions and is characterized by coating the titanium dioxide pigment particles with small but effective amounts of an esterified styrene-maleic anhydride copolymer.

BACKGROUND OF THE INVENTION

The invention would appear to be classified in the chemical art relating to treatment of titanium dioxide pigment with organic materials.

Titanium dioxide has long been accepted as the premium white pigment for use in paints, rubber, paper and other industrial applications. For many years it was produced almost exclusively by the so-called "sulfate process" wherein a titaniferous ore is digested with concentrated sulfuric acid to produce a digest cake which upon dissolution with water forms an iron-titanium sulfate solution from which a $TiO_2$ hydrate is precipitated, the $TiO_2$ hydrate being thereafter dried and calcined to produce pigmentary grade $TiO_2$. More recently a second technique for producing $TiO_2$ pigment has been developed. This is referred to as the chloride or vapor phase process wherein $TiCl_4$ in the vapor phase is reacted with oxygen or an oxygen containing gas at elevated temperatures to produce a pigmentary grade titanium dioxide.

Pigmentary titanium dioxide, whether made by the sulfate process or the chloride process, is produced as a powdery white material which is bagged for shipment to the ultimate user. Needless to say producers of pigmentary titanium dioxide, of which there are relatively few throughout the world store the bagged pigment in warehouses by stacking the bags one on top of the other until such time as the pigment is shipped. The bagging and stacking of bags as well as shipment of bagged pigment whether by truck or rail car inevitably settles and compresses the pigment in the bags with the result that by the time the pigment reaches its destination the individual pigment particles will have been compacted to form firm agglomerates. If pigment containing a large proportion of these firm agglomerates is added to paint formulations, rubber compositions, paper "stuff" and the like the characteristically poor wettability of the agglomerated pigment particles inhibits dispersion of the pigment in the vehicle. Hence it has been necessary for the paint manufacturer, and other users of pigmentary titanium dioxide, to subject the agglomerated pigment to a severe agitation to break up the agglomerates; and in as much as the agglomerates are consistently firm and hence difficult to break down into their individual particles considerable energy is required and hence relatively high manufacturing costs are incurred.

The discovery has now been made that when a titanium dioxide pigmentary material is milled in the presence of an esterified styrene maleic anhydride copolymer the individual titanium dioxide particles will be coated with the copolymer, the effect of which is two-fold namely to reduce the number of agglomerates that form during storage and also to minimize the adhesive forces of the agglomerates that do form. As a consequence the few agglomerates that are formed can be readily broken up into their individual pigment particles with a minimum expenditure of energy and time. This characteristic of the finished pigment is referred to herein as "ease of wetting" or "wettability" and is measured by a test hereinafter identified as "fineness of grind."

SUMMARY OF THE INVENTION

Briefly the invention relates to a $TiO_2$ pigment having improved wettability in industrial formulations characterized by having a coating of a small but effective amount of an esterified styrene-maleic anhydride copolymer on the individual pigment particles; and to a method for making the same by milling the pigment in the presence of said esterified copolymer.

The esterified styrene-maleic anhydride copolymer used in carrying out the present invention is one of a family of short chain copolymers of styrene and maleic anhydride which have been modified by partial esterification. The basic structure of these short chain copolymers, prior to esterification, is represented below:

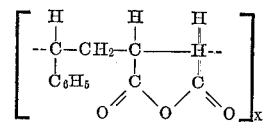

and may comprise any one of several base resins wherein the ratio of styrene to maleic anhydride varies from 1:1 to 3:1; X (the number of units in the chain) varies from 2 to 8 and the molecular weights vary from 700 to 2200.

It has been found however that for the purposes of this invention a base resin in which the ratio of styrene to maleic anhydride is 1:1, (X) varies from 7 to 8, and the molecular weight is from 1700 to 1800 is preferred, which, after partial esterification, may be represented by the formula:

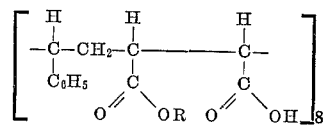

where R is butyl Cellosolve ($CH_6CH_2OC_4H_9$). This copolymer is manufactured by Sinclair Petrochemicals, Inc. under the trade name "SMA-1440" and may be in the form of a dry water-insoluble powder, designated commercially as SMA 1440–A; or in the form of an alkaline solution, i.e., ammoniacal solution, made by hydrolyzing the powder with ammonium hydroxide- and designated as SMA–1440–H. As a dry powder this esterified copolymer may be blended with dry titanium dioxide or may be added to an aqueous titanium dioxide slurry; and as an ammoniacal solution it may be added to the titanium dioxide by spraying or sprinkling thereon. For purposes of brevity the term esterified copolymer or esterified styrene-maleic copolymer, as used hereinafter, will be understood to have reference to both the anhydride SMA–1440–A and the ammoniacal solution SMA–1440–H. However irrespective of the form in which it is used it is essential that the esterified copolymer be added to the pigment either prior to or simultaneously with the final milling of the pigment in order to insure a coating of the esterified copolymer on each individual particle of titanium dioxide. This may be accomplished by adding the esterified copolymer to an aqueous slurry of the calcined pigment in the conventional process of coating the calcined $TiO_2$ with hydrous metal oxides;

or by adding the esterified copolymer to the hydrous oxide coated TiO₂ just prior to or during final milling.

With reference to the final milling of the titanium dioxide this will be understood to include milling with ring-roller mills, fluid energy mills and the like. Especially successful results have been achieved using a steam micronizer at a steam to pigment ratio of from 2:1 to 10:1 and pressures of from 50–90 p.s.i.g. It will be understood however that any milling technique may be employed whereby the esterified copolymer is distributed uniformly over the surfaces of the individual titanium dioxide particles.

Following milling, the copolymer coated pigment is discharged into suitable collecting-means from which it is fed into bags for shipment. While the coated pigment particles tend to reagglomerate during bagging and storage the agglomerates are relatively few in number and those that are formed are relatively weak and hence readily broken up with a minimum of work—which is to say that the pigment is easily wetted by the particular vehicle to which it is added. While it is not definitely known to be the case, it is postulated that the esterified copolymer coating on the individual pigment particles reduces the forces of attraction between the individual particles with the beneficial results aforementioned; and in this connection it has been discovered that the esterified copolymer is unique in that it adheres to the individual particles of titanium dioxide and hence is not removed during subsequent processing steps. In contradistinction many of the organic dispersing agents currently in use i.e. triethanolamine, pentaerythritol, trimethanolamine, trimethylolpropane and the like do not form as strong a bond with the pigment and hence when added to a pigment slurry are partially lost during subsequent processing steps.

DESCRIPTION OF THE PREFERRED EMBODIMENT

As stated above the improved TiO₂ pigment of this invention is characterized by having uniformly distributed over the surface of the pigment particles from 0.1% to 1.0% and preferably from 0.1% to 0.8%, on a dry solids basis, of an organic treating agent comprising a water-insoluble esterified copolymer of a styrene-maleic anhydride; and is prepared by adding the esterified copolymer, either in the form of a dry powder or an alkaline aqueous solution, to the pigment prior to final milling.

The amount of the esterified copolymer deposited on the pigment is small, the minimum effective amount being as low as 0.1% on a dry solids basis. Increased amounts of copolymer up to about 1.0% have been found to progressively reduce agglomeration of the pigment and to increase its ease of wetting in various coating compositions. Amounts in excess of 1.0% or higher show no significant improvements over lower amounts and in fact may be detrimental to certain properties of the pigment, i.e., brightness and optical properties, and hence are undesirable, the preferred range being from about 0.1% to about 0.8%.

The TiO₂ pigment benefited by the present invention may be of the anatase or rutile modification made by either the well-known sulfate-process or the more recently developed chloride process; and as the case may be is treated with small amounts of precalcination treating agents such as are known and used in the art to enhance brightness and induce rutilization; as well as post-calcination treating agents such as the hydrous oxides of titanium, aluminum, silicon, zirconium, and similar elements for improving the color, resistance to chalking and other pigmentary properties. The amounts of treating agents used are well known in the art and generally less than about 5% of the weight of the pigment.

While the esterified copolymer may be added to the TiO₂ pigmentary material as a dry powder it is also convenient to use an alkaline solution of the copolymer. According to this method the alkaline solution, as for example an ammoniacal solution, is added to water to form an aqueous solution of from 11.0 to 35.0% (solids). This aqueous solution may be then sprayed or sprinkled from suitable feed pipes onto a moving bed of pigment being fed to a stream micronizer, the amount of esterified copolymer added being such as to insure from about 0.1 to 1.0% on the pigment.

As mentioned at the outset, to be effective the esterified copolymer must be applied to the pigment prior to or during final milling. Experimental evidence shows that relatively mild mixing or blending of the dry powdered copolymer with the finished pigment is ineffective. It has also been discovered that the effectiveness of the esterified copolymer as an agent for improving the wettability of a pigment in a coating composition depends upon intimately associating the copolymer with the pigment particles, i.e., on coating the individual pigment particles with the esterified copolymer; and that the mere addition of the copolymer to a coating composition per se, i.e., as one constituent of a paint composition, does not improve the ease of wetting of the pigment.

Thus the success of the present invention is the discovery that by milling TiO₂ pigment in the presence of an esterified styrene-maleic anhydride copolymer, added either as an aqueous solution or dry powder, at an intensity sufficient to coat the individual TiO₂ particles with the esterified copolymer the coated pigment will have superior wettability in industrial coating compositions, even after prolonged periods of storage. Moreover comparative tests of titanium dioxide treated with the copolymer and titanium dioxide treated with known organic dispersing agents such as triethanolamine, pentaerythritol or trimethylolpropane show conclusively the superior wettability of the copolymer treated pigments.

In the example set out below the following test was used for determining ease of wetting of the copolymer treated pigment.

FINENESS OF GRIND TEST 500 gms. pigment are added to 194.5 gms. Syntex 40 (a soy bean oil product of Jones-Dabney Co., Newark, N.J.) and the mixture stirred vigorously for 8 minutes after which an additional 63.5 gms. of Syntex are added and the mixture stirred vigorously for another 2 minutes. 60.6 gms. of the resulting paste are then poured into a one quart can to which is added 36.3 gms. of Syntex 40 and 24 cc. of mineral spirits. The can is then shaken for 10 minutes using a Red Devil Paint Conditioner after which the can is rolled for one hour.

The paste is then drawn down the wedge shaped channel of a Hegman gauge and a visual evaluation made immediately of the protruding coaser particles. The gauge has a scale reading from 0–8. The number nearest the fineness of the grind boundary line on the gauge is taken as the fineness of grind of the pigment the higher the number the finer the pigment, i.e., the more completely the agglomerates have been broken down into individual particles.

In the following examples the TiO₂ pigment selected to illustrate the invention is one which is highly chalk resistant, sometimes referred to in the art as a non-chalking pigment, and as such is especially difficult to wet in most industrial coating compositions. The pigment was obtained as dryer discharge and treated with the esterified styrene-maleic copolymer at various levels from 0.1 to 1.0% (on a dry solids basis) either by spraying an ammoniacal solution of the copolymer onto the pigment prior to final milling or by adding the dry copolymer powder to an aqueous slurry of the pigment during the treatment stages. The copolymer treated pigment was then steam milled in a twenty inch steam micronizer at a steam to pigment ratio of 5:1 and pressure of 90 p.s.i.g.

Turning now to the examples these have been arranged in three groups wherein all of the examples in each group used the same base pigment. Examples I–VIII show the superior wettability, of a rutile, non-chalking titanium dioxide pigment treated with the esterified styrene-maleic copolymer in amounts ranging from 0.5 to 1.0% on a dry solids basis as against similar pigments treated with commercially known organic dispersing agents such as trimethylolpropane (TMP) and pentaerythritol (PE). Examples IX–XIV are similar to the preceding tests except that a new base pigment was used which again was a rutile non-chalking type, the amount of esterified copolymer used in these tests being from 0.1% and 0.8%. Pentaerythritol was used for comparative purposes. In Examples XV and XVI a fresh base pigment was used which again was rutile non-chalking grade the amount of esterified copolymer being 0.23% on a solids basis. In this case triethanolamine was used for comparative purposes.

EXAMPLES I–VIII

A high chalk resistant rutile titanium dioxide pigment as dryer discharge was fed by means of a traveling belt to a steam micronizer at the rate of 300 lbs./hr. In this series of tests the esterified styrene-maleic anhydride copolymers, both in the form of a dry powder (SMA 1440–A) and as an ammoniacal solution (SMA 1440–H) were used; also trimethylolpropane (TMP) and pentaerythritol (PE) for comparative purposes, each organic material being used in amounts of 0.5% and 1.0% respectively on a dry solids basis. To facilitate applying the organic materials to the dryer discharge aqueous solutions were prepared, (with the exception SMA 1440–A) and fed to the pigment from a set of overhead sprinklers at a feed rate commensurate with the amount of organic coating desired on the pigment. For a coating of 0.5%, on $TiO_2$ weight basis, the rate of feed was 110 ml./min.—which rate was doubled for effecting a coating of 1.0%. The SMA 1440–A powder was not soluble in water so was ground in a hand mortar and then dry blended with the drier discharge. The system micronizer was operated at a steam to pigment ratio of 5:1 and a ring pressure of 90 p.s.i.g. The coated pigments were then tested for wettability using the fineness of grind test described above.

The wettabilities of the treated pigments are shown in the table below from which it will be seen that the wettability of the esterified copolymer coated pigments both initially and after one month storage was superior to the wettability of the pigments treated with trimethylolpropane and pentaerythritol.

EXAMPLES X–XIV

In these series of experiments another batch of non-chalking rutile titanium dioxide as dryer discharge was used. The organic treating agents were the esterified copolymer SMA 1440–H and triethanolamine which were sprayed onto the pigmentary dryer discharge at levels to provide 0.1 and 0.8 wt. percent on the finished pigment. The treated pigments were then mixed in a drum roller for 20–30 minutes. Also a commercial dispersant, in this case, pentaerythritol in the form of a dry powder was added in similar amounts to pigmentary material at the micronizer feed, the feed rate of each of the organics being regulated to give the desired level of treatment. Final micronizing of all the treated pigments was done in a steam micronizer at a steam to pigment ratio of 5:1.

As shown in the table below the ease of wetting of the SMA 1440–H copolymer coated pigments was considerably better than that of the pentaerythritol coated pigment and slightly better than the triethanolamine coated pigment.

EXAMPLES XV–XVI

Two additional experiments were run using still another sample of non-chalking rutile $TiO_2$ dryer discharge to which were added the copolymer SMA 1440–H and triethanolamine, respectively, as dilute aqueous solutions after which the treated pigments were blended for 20–30 minutes in a drum roller the additions being at the 0.23% level (solids basis). Thereafter the treated pigments were steam micronized at 5:1 steam:pigment ratio. The data on wettability is shown in the table below.

TABLE 1

Organic additions to rutile titanium dioxide calciner discharge

| | Organic addition | Initial F.G. | After 1 month storage F.G. |
|---|---|---|---|
| Exp. I–VIII: | | | |
| I | 0.5 PE | 4½ | 4¾ |
| II | 1.0 PE | 6 | 5 |
| III | 0.5 TMP | 3 | 3½ |
| IV | 1.0 TMP | 4 | 4½ |
| V | 0.5 SMA–H | 5¾ | 5¾ |
| VI | 1.0 SMA–H | 6¾ | 6¾ |
| VII | 0.5 SMA–A | 6¾ | 6¾ |
| VIII | 1.0 SMA–A | 6¾ | 7 |
| Exp. IX–XIV: | | | |
| IX | 0.1 PE | 2 | |
| X | 0.8 PE | 3.5 | |
| XI | 0.1 SMA–H | 4 | |
| XII | 0.8 SMA–H | 6.5 | |
| XIII | 0.1 TEA | 5.0 | |
| XIV | 0.8 TEA | 4.75 | |
| Exp. XV–XVI: | | | |
| XV | 0.23 percent TEA | 4.5 | |
| XVI | 0.23 percent SMA–H | 5.75 | |

It may be concluded therefore that by applying a coating of a styrene-maleic anhydride copolymer and in particular an esterified copolymer of the SMA 1440 series to a titanium dioxide pigment prior to or during final milling the individual pigment particles will acquire an intimate coating of the copolymer which is not removed by subsequent processing steps; which minimizes agglomeration of the individual pigment particles during storage and shipping; and which weakens the bond between the individual pigment particles such that any agglomerates that are formed are easily friable and hence readily broken up into individual pigment particles with a minimum expenditure of energy.

I claim:

1. In a process for producing a titanium dioxide pigment having improved wettability and pigmentary properties in coating compositions wherein a titanium dioxide pigmentary material is treated in aqueous slurry with hydrous metal oxides and subsequently dried and milled the improvement comprising: treating the pigmentary material with an esterified styrene-maleic anhydride copolymer selected from the group consisting of copolymers having the formulas

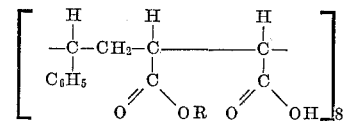

and

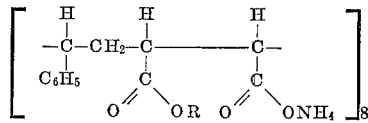

wherein R is butyl Cellosolve, by adding from 0.1% to 0.8% of one of said esterified copolymers on a dry pigment basis to the pigmentary material following calcination, and then steam milling the treated pigment in the presence of the esterified copolymer at a steam to pigment ratio of from 2.5:1 to 10:1 to uniformly distribute the copolymer on the individual pigment particles.

2. In a process for producing a titanium dioxide pigment having improved wettability and pigmentary properties in coating compositions according to the improvement of claim 1 wherein the esterified styrene-maleic anhydride copolymer is a water insoluble dry powder having the formula

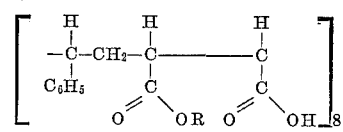

wherein R is butyl Cellosolve and said pigment material is treated with said dry copolymer powder by adding the latter to the aqueous slurry of said pigmentary material during treatment thereof with said hydrous metal oxides.

3. In a process for producing a titanium dioxide pigment having improved wettability and pigmentary properties in coating compositions according to the improvement of claim 1 wherein the esterified styrene-maleic anhydride copolymer is an ammoniacal solution having the formula

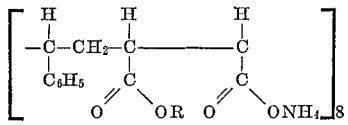

wherein R is butyl Cellosolve, said ammoniacal solution being applied to said pigmentary material following treatment thereof with said hydrous metal oxides.

4. A titanium dioxide pigment having improved wettability in coating compositions comprising individual titanium dioxide particles having a uniformly distributed coating thereon comprising from 0.1 to 0.8 on a dry pigment basis of an esterified styrene-maleic anhydride copolymer having the formula

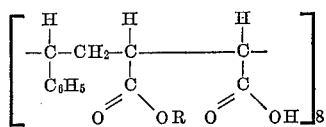

wherein R is butyl Cellosolve.

References Cited

UNITED STATES PATENTS

| | | | |
|---|---|---|---|
| 2,737,460 | 3/1956 | Werner | 106—300 |
| 2,744,029 | 5/1956 | Kingsbury | 106—300 |
| 2,913,437 | 11/1959 | Johnson. | |
| 3,076,719 | 2/1963 | Whately et al. | 106—300 |
| 3,200,000 | 8/1965 | Williams. | |
| 3,205,085 | 9/1965 | Bailin | 106—300 |
| 3,224,993 | 12/1965 | Wynne. | |
| 3,236,797 | 2/1966 | Williams. | |
| 3,345,187 | 10/1967 | Binnis | 106—300 XR |
| 3,425,855 | 2/1969 | Barksdale et al. | 106—300 |
| 3,436,239 | 4/1969 | Feld | 106—300 |

FOREIGN PATENTS

| | | |
|---|---|---|
| 717,838 | 8/1950 | Great Britain. |
| 1,025,960 | 4/1966 | Great Britain. |

HELEN M. McCARTHY, Primary Examiner

H. M. S. SNEED, Assistant Examiner

U.S. Cl. X.R.
106—308; 241—5, 16